United States Patent [19]

Rao et al.

[11] 4,284,692
[45] Aug. 18, 1981

[54] COMPOSITIONS FOR STABILIZING ELECTROLYTES IN LI/TIS$_2$ SYSTEMS

[75] Inventors: Bhaskara M. L. Rao, Fanwood; Daniel J. Eustace, Scotch Plains; Dan Farcasiu, Princeton, all of N.J.

[73] Assignee: Exxon Research & Engineering Co., Florham Park, N.J.

[21] Appl. No.: 144,680

[22] Filed: Apr. 28, 1980

[51] Int. Cl.$^3$ .............................................. H01M 6/14
[52] U.S. Cl. .................................. 429/194; 429/197
[58] Field of Search ..................... 429/194, 197, 218

[56] References Cited

U.S. PATENT DOCUMENTS

| 4,002,492 | 1/1977 | Rao | 429/194 |
| 4,104,451 | 8/1978 | Klemann et al. | 429/194 |
| 4,118,550 | 10/1978 | Koch | 429/194 |
| 4,125,687 | 11/1978 | Di Salvo, Jr. et al. | 429/194 |
| 4,139,681 | 2/1979 | Klemann et al. | 429/194 X |
| 4,194,062 | 3/1980 | Carides et al. | 429/194 |

OTHER PUBLICATIONS

"Inefficiency Mechanisms in Plating & Stripping Lithium from a LiAsF$_6$-Dioxolane Electrolyte", J. Electrochem Soc. 126 (11) Nov. 1979.
"Electroinitiated Polymerization of Tetrahydrofuran", J. Electrochem. Soc. 121 (10), Oct. 1974, p. 1294, Dey & Rudd.

*Primary Examiner*—Charles F. LeFevour
*Attorney, Agent, or Firm*—Robert S. Salzman

[57] ABSTRACT

A current producing Li/TiS$_2$ electrochemical cell is featured which has a cyclic ether-containing electrolyte, and an inhibitor against the polymerization of the cyclic ether by TiS$_2$, which cyclic ether otherwise polymerizes in the presence of TiS$_2$.

12 Claims, 2 Drawing Figures

FIRST DISCHARGE DATA OF Li/TiS$_2$ CELL* IN 2.5M LiAsF$_6$ DIOX:DME (80:20) WITH 2% 2-POLYVINYLPYRIDINE POLYSTYRENE

CURRENT DENSITY ($mA/cm^2$)

*CELLS ARE RECHARGEABLE IN THAT 3 CYCLES 70% M.U. HAS BEEN NOTED AT C/10 RATE CHARGE - DISCHARGE.

FIRST DISCHARGE DATA OF Li/TiS$_2$ CELL* IN 2.5 M LiAsF$_6$ DIOX:DME (80:20) WITH 2% 2-POLYVINYLPYRIDINE POLYSTYRENE

*CELLS ARE RECHARGEABLE IN THAT 3 CYCLES 70% M.U. HAS BEEN NOTED AT C/10 RATE CHARGE - DISCHARGE.

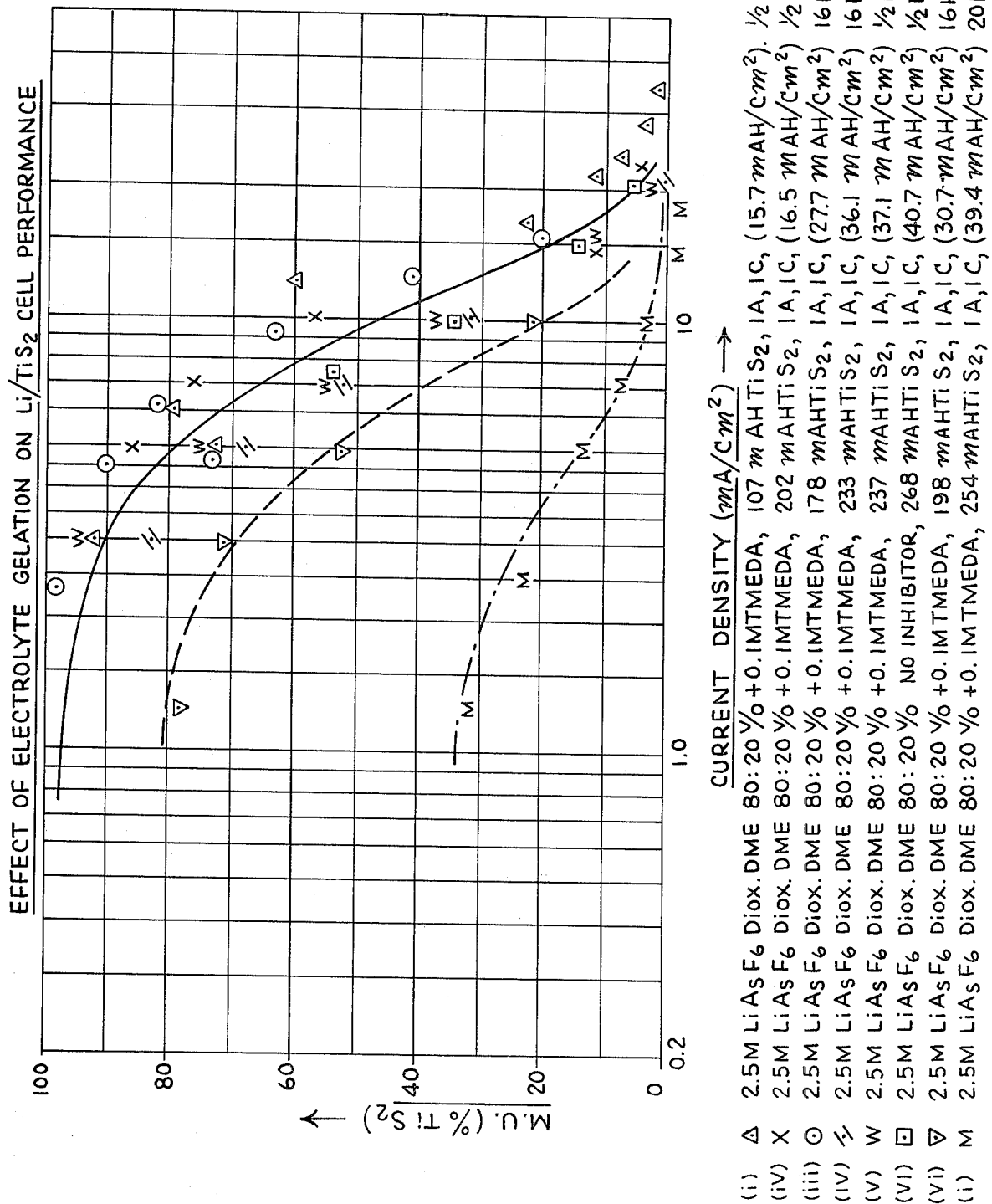

COMPOSITIONS FOR STABILIZING ELECTROLYTES IN LI/TIS₂ SYSTEMS

FIELD OF THE INVENTION

The invention relates to current producing Li/TiS$_2$ electrochemical cells, and more particularly to Li/TiS$_2$ cells having inhibitors to prevent polymerization of the dioxolane-containing electrolyte.

BACKGROUND OF THE INVENTION

Current producing Li/TiS$_2$ electrochemical cells which contain dioxolane or other cyclic ethers in the electrolyte have proven troublesome. The dioxolane in the electrolyte of these cells tends to rapidly polymerize in the presence of the titanium disulfide of the cathode and the lithium salt solute of the electrolyte. It has been hypothesized that the acidic sites of the titanium disulfide cathode are responsible for ring opening and subsequent polymerization of the dioxolane which is a cyclic acetal. The lithium salt solute can initiate polymerization by virtue of its acidity.

The present invention recognizes that any inhibition of this polymerization should logically be initiated at its inception, i.e. in terms of the TiS$_2$, at the acidic sites of the cathode, and in terms of the lithium salt as a dissolved component of the electrolyte. As such, the invention proposes a number of inhibitor materials which can be incorporated into the cathode and electrolyte. Some of these materials are sparingly soluble in the electrolyte, and others are soluble. These are designed to be mixed with the electrolyte or leach from the cathode into the electrolyte. All of the inhibitors are designed to neutralize the acidic effects of the titanium disulfide or the lithium salt without affecting the current producing capabilities or proper operation of the electrochemical cell.

In terms of the TiS$_2$, such inhibitors must not only prevent polymerization of the electrolyte solvent but have the further property of not intercalating into the TiS$_2$ in order to maintain self-performance.

In terms of the lithium salt solute, the inhibitors need only to prevent polymerization of the electrolyte solvent.

DISCUSSION OF THE PRIOR ART

It is known in the prior art that electrolytes containing dioxolane can react with the lithium metal of the cell electrode and cause the dioxolane to polymerize. Such a teaching may be found in the abstract (only an abstract is available) to: P. G. Gugla; Inefficiency Mechanisms in Plating and Stripping Lithium from a LiA$_s$F$_6$-Dioxolane Electrolyte; Abstract No. 714 RNP; *Journal of the Electrochemical Society* 126 (11), November 1979.

In another article to: A. N. Dey and E.J. Rudd; Electroinitiated Polymerization of Tetrahydrofuran; *Journal of the Electrochemical Society: Electrochemical Science and Technology;* 121 (10), October 1974 at Pg. 1294, it was stated that the presence of either lithium metal or moisture (0.5% or more) in the working electrode compartment inhibited the polymerization of tetrahydrofuran, a similar solvent to dioxolane.

Clearly, it is never an easy task to discern beforehand what particular inhibitor will operatively stabilize an electrolyte in any given electrochemical cell.

In the case of a Li/TiS$_2$ cell having an electrolyte containing a lithium salt solute in a cyclic ether solvent comprising, such as dioxolane or THF, it has been discovered by the inventors that the acidic nature of the TiS$_2$ cathode and lithium salt will rapidly polymerize the cyclic ether solvent. The subject invention seeks to inhibit the polymerization of the solvent in the subject cell.

SUMMARY OF THE INVENTION

The invention features a current producing Li/TiS$_2$ electrochemical cell. The cell has an electrolyte containing at least one lithium salt solute in a cyclic ether solvent such as dioxolane. The cell contains at least one composition for inhibiting polymerization of the solvent by TiS$_2$ and/or the lithium salt. The compositions are selected from a group consisting essentially of at least one of the following:

(a) Li$_x$TiS$_2$ where: x is less than approximately 0.1 and greater than approximately 0.025; and (b) at least one sterically hindered amine which does not intercalate with TiS$_2$.

In terms of the polymerization of the solvent by TiS$_2$, the inhibitor Li$_x$TiS$_2$ will be an integral part of the cathode.

In terms of the polymerization of the solvent by the lithium salt solute, the sterically hindered amines can be added to the cathode or the electrolyte.

By "sterically hindered amines" it is meant for purposes of this invention, those amines that have bulky substituents adjacent to the basic site to block intercalation with TiS$_2$ or those amines which are built into a polymeric structure which will likewise prevent intercalation.

It is an object of the invention to provide an improved current producing Li/TiS$_2$ electrochemical cell;

It is another object of this invention to provide a current producing Li/TiS$_2$ electrochemical cell having an electrolyte containing at least one lithium salt solute in a solvent of a cyclic ether such as dioxolane, and an inhibitor to prevent or retard the polymerization of the cyclic ether.

It is a further object of the invention to provide inhibitors which will substantially neutralize the acidic effects of titanium disulfide and/or lithium salt solutes in a current producing electrochemical cell of the Li/TiS$_2$ type, without substantially affecting the current producing capabilities or proper operation of the cell.

These and other objects of this invention will be better understood and will become more apparent with reference to the following detailed description considered in conjunction with the accompanying drawings.

BRIEF DESCRIPTION OF THE DRAWINGS

FIG. 2 illustrates a graph of the effect of another sterically hindered amine for inhibiting the gelation of the electrolyte in Li/TiS$_2$ cells.

DETAILED DESCRIPTION OF THE INVENTION

Figure 1:
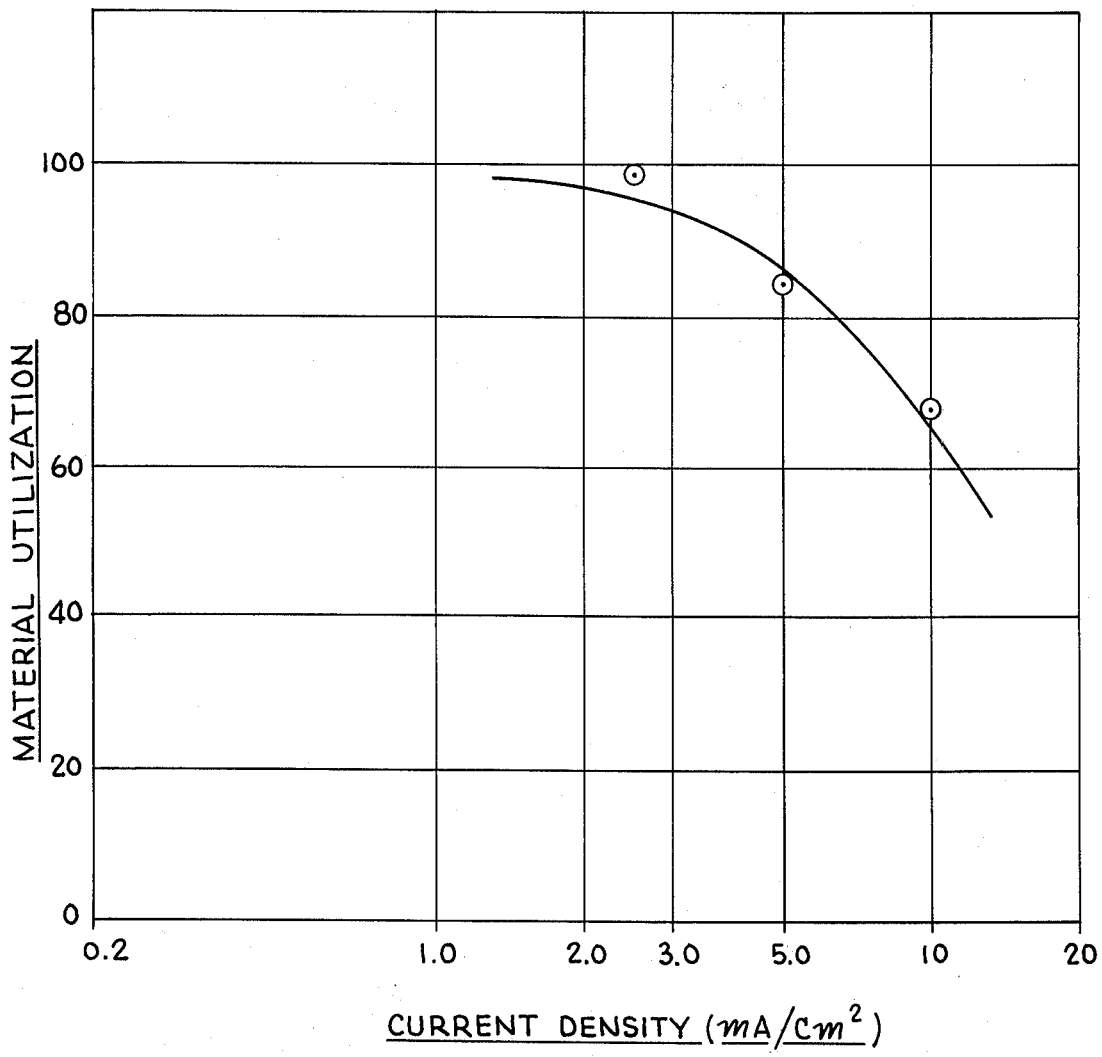
FIG. 1 shows a graph of the operation of a current producing Li/TiS$_2$ electrochemical cell of this invention containing a sterically hindered amine for preventing polymerization of the dioxolane in the electrolyte solvent.

Generally speaking, the invention is for inhibitors used in a current producing Li/TiS$_2$ electrochemical cell having an electrolyte containing at least one lithium salt in a cyclic ether solvent such as dioxolane, as taught in the copending U.S. patent application, Ser. No. 115,997 now abandoned; filed Jan. 28, 1980, and assigned to a common assignee. Construction of this cell is taught therein, and is meant to be incorporated herein by reference. The lithium salt solute of the electrolyte can be a super acid salt having the general formula:

$$LiXFa \qquad (1)$$

wherein X is selected from a group consisting of B, P, Sb, and As, and wherein a is 4 for B and 6 for P, Sb, and As. The preferred salt is $LiAsF_6$.

The cyclic ether solvent can be 1,3 dioxolane (DIOX) mixed with 1,2 dimethoxyethane (DME) in a range of ratios of DIOX:DME from 100/0 to 40/60 percent by weight.

The lithium salt solutes are generally in a range of concentrations between 0.5 and 4.0 molal.

The current producing electrochemical cell can be a secondary rechargeable battery system.

It has been discovered that the cyclic ether solvents of the dioxolane type will be catalytically polymerized by the titanium disulfide of the cathode and the acidity of the lithium salt solutes. As a consequence of this discovery, the invention proposes as one solution that inhibition of this polymerization should be initiated at the acidic sites of the $TiS_2$ cathode, i.e., the cathode should logically contain the inhibitor material(s).

It is also contemplated that soluble inhibitor materials can be mixed with the electrolyte. Sparingly soluble inhibitors which will not mix with the electrolyte are best introduced via the cathode, and leach from the cathode into the electrolyte.

The inhibitors of the invention can comprise at least one of the following materials:

(a) $Li_xTiS_2$ where x is less than approximately 0.1 and greater than approximately 0.025; and/or (b) at least one sterically hindered amine.

The purpose of utilizing sterically hindered amines is to prevent the intercalation of the acid-neutralizing amines with the titanium disulfide of the cathode as previously defined. Prevention of such intercalation is desirable so as not to disturb the performance of the cell.

Examples of sterically hindered amines for purposes of description can be tertiary amines or pyridines of high molecular weight, such as macro-molecules, polymers or generally complex molecular structures: for instance, tetramethylethylenediamine; 1,8-bis (dimethylamino-) naphthalene; 2,2,6,6-tetramethylpiperidine; poly(-vinylpyridine) or a vinylpyridine-styrene copolymer, etc.

It has been shown that dioxolane will gel in less than one day in a system utilizing an electrolyte comprising $LiAsF_6$ dissolved in 80:20 dioxolane-dimethoxyethane (see Table I below), when it comes in contact with $TiS_2$.

When 2% of a 7:3 copolymer of 2-vinylpyridine and styrene was mixed with the electrolyte, polymerization was inhibited, as shown in Table I below, and as illustrated in the signature curve of FIG. 1:

TABLE I

INHIBITION OF $TiS_2$ CATALYZED POLYMERIZATION OF 1:3-DIOXOLANE BY COPOLYMER OF 2-VINYLPYRIDINE AND STYRENE

| No. | Electrolyte | Additive | Gelation Time |
|---|---|---|---|
| 1 | 2.5M $LiAsF_6$ Diox·DME 80:20 | None | 19 days* |
| 2 | 2.5M $LiAsF_6$ Diox·DME 80:20 | $TiS_2$ | 1 day* |
| 3 | 2.5M $LiAsF_6$ Diox·DME 80:20 | 2%, poly 2-vinylpyridine poly-styrene | 52+ days** |
| 4 | 2.5M $LiAsF_6$ Diox·DME 80:20 | $TiS_2$ + 2%, poly 2-vinylpyridine poly-styrene | 5+ days** |

Comparison of (1) and (3) indicates inhibition of polymerization of 1:3-dioxolane in the presence of $LiAsF_6$.
Comparison of (2) and (4) indicates inhibition of polymerization of 1:3-dioxolane in presence of $LiAsF_6$ and $TiS_2$.

*Experiment run at ambient temperature
**Experiment run at 70° C.

Referring to FIG. 2, a plurality of discharge signature curves for $Li/TiS_2$ cells. is shown. The cells contain 15-40 mah/cm$^2$ cathodes, and readings were taken at various intervals after the addition of 2.5 M $LiAsF_6$·DIOX.DME 80:20% electrolyte.

It is observed that when the cell is allowed to stand, the cell performance will deteriorate due to the gelation of the electrolyte in the pores of the high capacity density cathodes, as $TiS_2$ catalytically polymerizes the dioxolane.

The cell performance on open circuit stand is not affected in the high capacity density cathodes where 0.1 m tetramethylethylenediamine (TMEDA) inhibitor has mixed with the electrolyte. The TMEDA suppresses the catalytic activity of the $TiS_2$ to polymerize dioxolane in the presence of the superacid anion.

Neutralization of the acidity of $TiS_2$ by partial lithiation and in the presence of amines is shown in Table II presented below. Reduction of gelation-causing interstitial sulfur from $TiS_2$ is shown to be affected by lithiation or amine complexation with sulfur.

TABLE II

STABILITY OF $LiAsF_6$ DIOXOLANE·DME·ELECTROLYTE

| ELECTROLYTE | No. 1 | No. 2 | No. 3 |
|---|---|---|---|
| | 2.5M $LiAsF_6$·DOL | 2.5M $LiAsF_6$·DOL·DME 80:20 V/O | 2.5M $LiAsF_6$·DOL·DME 50:50 V/O |

←——Test 50° C.——→

DURATION OF ELECTROLYTE STABILITY* (DAYS)

ADDITIVES

| | | | | | |
|---|---|---|---|---|---|
| 1 | SET-1 | Control | 1 | 19 | 121 |

TABLE II-continued

STABILITY OF LiAsF$_6$ DIOXOLANE·DME·ELECTROLYTE

|  |  |  |  |  |  |
|---|---|---|---|---|---|
| 2 |  | TiS$_2$ | 1/16 | 3 | 44 |
| 3 |  | Li | 114 | 148 | 121 |
| 4 |  | LiTiS$_2$ | 121 | 121 | 121 |
| 5 |  | Li$_{0.1}$TiS$_2$ | 60 |  |  |
| 6 |  | Li$_{0.05}$TiS$_2$ | 10 |  |  |
| 7 | SET-II | TiS$_2$ + (Li*) | 121 | 121 | 121 |
| 8 |  | TiS$_2$ + LiCl | 2 |  |  |
| 9 |  | TiS$_2$ + LiBr | 2 |  |  |
| 10 |  | TiS$_2$ + LiI | 121 |  |  |
| 11 |  | TiS$_2$ + LiSCN | 121 |  |  |
| 12 |  | TiS$_2$ + TEA |  | 121 | 121 |
| 13 |  | TiS$_2$ + DMEDA |  | 121 | 121 |
| 14 |  | TiS$_2$ + TMEDA |  |  |  |
| 15 | SET-III | LiCl | 2 |  |  |
| 16 |  | LiBr | 56 |  |  |
| 17 |  | LiI | 121 |  |  |
| 18 |  | LiSCN | 121 |  |  |
| 19 |  | LiOCH$_3$ | 121 | 121 | 121 |
| 20 |  | TMEDA | 121 | 121 | 121 |
| 21 |  | DMEDA | 121 |  |  |
| 22 | SET IV | Sulfur |  | 14 | 121 |
| 23 |  | Sulfur + (Li) |  | 121 | 121 |

*Solution becomes viscous or gels after this period.
Set-I. - Cell Active materials.
Set-II. - TiS$_2$ + inhibitors.
Set-III. - Inhibitors.
Set-IV. - Impurity + inhibitor Table III below illustrates the inhibition of the polymerization of tetrahydrofuran (THF) by the addition of 1,8-bis(dimethylamino)-naphthalene.

TABLE III

| Solution | Begins to Polymerize | Is Completely Polymerized |
|---|---|---|
| 1 Molal LiTaF$_6$ in THF | 1 day | 3 days |
| 1 Molal LiTaF$_6$ + 0.09 mole of 1,8-bis(dimethylamino)-naphthalene in THF | 21+ days |  |

Having thus described the invention, what is desired to be protected by Letters Patent is presented by the following appended claims.

What is claimed is:

1. In a current producing Li/TiS$_2$ electrochemical cell having an electrolyte containing at least one lithium salt solute in a solvent comprising a cyclic ether, at least one composition for inhibiting polymerization of said cyclic ether by TiS$_2$, said composition being selected from a group consisting essentially of at least one of the following:
(a) Li$_x$TiS$_2$
where: x is less than approximately 0.1 and greater than approximately 0.025; and
   (b) at least one sterically hindered amine which does not intercalate with TiS$_2$.

2. In the current producing Li/TiS$_2$ electrochemical cell of claim 1, the composition wherein one of said sterically hindered amines comprises 1,8-bis (dimethylamino-) naphthalene.

3. In the current producing Li/TiS$_2$ electrochemical cell of claim 1, the composition wherein one of said sterically hindered amines comprises 2,2,6,6-tetramethyl piperidine.

4. In the current producing Li/TiS$_2$ electrochemical cell of claim 1, the composition wherein one of said polymeric amines comprises a polymeric pyridine, such as: polyvinylpyridine or copolymers of vinylpyridine with styrene.

5. In the current producing Li/TiS$_2$ electrochemical cell of claim 1, the composition wherein one of said sterically hindered amines comprises tetramethylethylenediamine.

6. In the current producing cell of claims 1, 2, 3, 4 or 5 wherein said electrolyte contains at least one lithium salt solute of the general formula: LiXF$_a$ where: "X" is selected from a group consisting of B, P, Sb and As, and wherein "a" is 4 for B and 6 for P, Sb and As.

7. In the current producing cell of claim 6, wherein one of said solutes is preferably LiAsF$_6$.

8. In the current producing cell of claims 1, 2, 3, 4, 5 or 6, wherein said dioxane is a cosolvent with dimethoxyethane in said electrolyte.

9. In the current producing cell of claim 8, wherein said dioxolane is in mixture with said dimethoxyethane in a range of ratios of dioxolane: dimethoxyethane from 100% to 40/60 percent by weight.

10. In the current producing cell of claim 1, wherein said cell is rechargeable.

11. In the current producing cell of claim 1, wherein said cell is a secondary battery cell.

12. In the current producing Li/TiS$_2$ electrochemical cell of claim 1, wherein said cell comprises a cathode, said cathode containing at least one of said inhibitor compositions.

* * * * *